United States Patent
Bruchelt

(10) Patent No.: US 8,359,017 B2
(45) Date of Patent: Jan. 22, 2013

(54) MOBILE DEVICE CALLER ID EXTENSION

(75) Inventor: Holger Bruchelt, Speyer (DE)

(73) Assignee: SAP AG, Walldorf (DE)

( * ) Notice: Subject to any disclaimer, the term of this patent is extended or adjusted under 35 U.S.C. 154(b) by 49 days.

(21) Appl. No.: 12/943,861

(22) Filed: Nov. 10, 2010

(65) Prior Publication Data

US 2012/0115449 A1    May 10, 2012

(51) Int. Cl.
*H04M 3/42*    (2006.01)
*G06F 15/16*    (2006.01)

(52) U.S. Cl. .................. 455/415; 379/210.01; 709/203

(58) Field of Classification Search .............. 455/415
See application file for complete search history.

(56) References Cited

U.S. PATENT DOCUMENTS

| | | | | |
|---|---|---|---|---|
| 5,999,611 | A * | 12/1999 | Tatchell et al. | 379/211.02 |
| 6,870,830 | B1 * | 3/2005 | Schuster et al. | 370/352 |
| 2003/0063732 | A1 * | 4/2003 | Mcknight | 379/210.01 |
| 2008/0028021 | A1 * | 1/2008 | Roberts et al. | 709/203 |

* cited by examiner

*Primary Examiner* — Kent Chang
*Assistant Examiner* — Ngan Pham Lu
(74) *Attorney, Agent, or Firm* — Blakely Sokoloff Taylor & Zafman LLP

(57) ABSTRACT

An extended display is provided for information based on caller ID during call notification for an incoming phone call on a mobile device. A system enables accessing scheduling information based on caller ID information for the incoming phone call. A contact is identified based on the caller ID information, and scheduling information related to the contact is displayed on the mobile device before the call is answered.

20 Claims, 4 Drawing Sheets

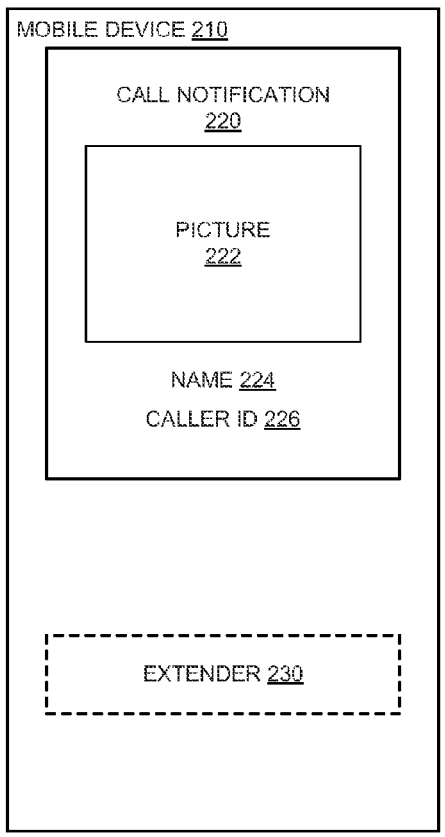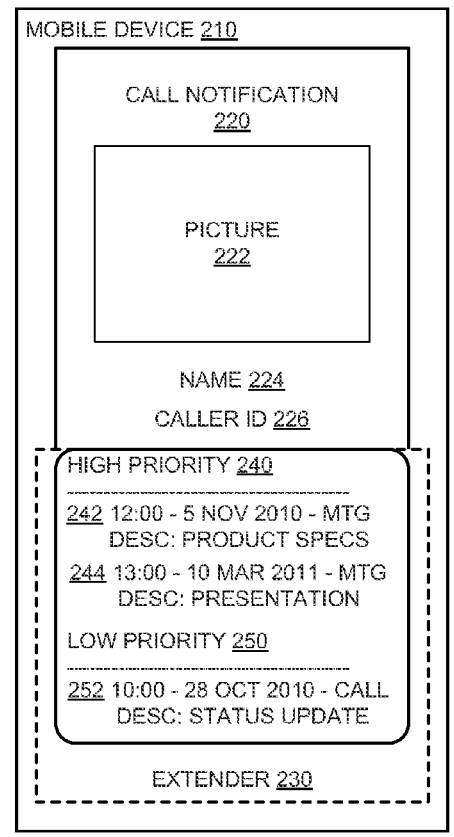
FIG. 2A
FIG. 2B

MOBILE DEVICE CALLER ID EXTENSION

FIELD

Embodiments of the invention are related generally to caller identification, and embodiments of the invention are more particularly related to extending caller ID on a mobile device with event information based on the caller ID.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2010, SAP AG, All Rights Reserved,

BACKGROUND

Incoming phone calls are frequently unexpected. With a mobile communication device, an incoming phone call may be received virtually any time, anywhere. When a mobile device user uses the mobile device for work or business, the user may get phone calls from customers or clients, as well as associates and colleagues. While the use of a mobile device to stay connected outside the office is one of the primary benefits of a mobile device, it also means that many calls may be received that are significantly outside the context of what a person is doing at any given time. The potential increases in a business context that a mobile device user will need to shift context to answer a phone call.

Especially as the number of contacts (any combination of customers, client, associates, and/or colleagues) increases, it may be difficult for an individual to shift focus from a task at hand to address an incoming phone call. Additionally, in a business context, many contacts may only be reached at infrequent intervals, or may be new contacts. Thus, there is often a lag period as a mobile device user tries to determine what a particular contact might be calling about. In most situations, the mobile device user would prefer to appear to the caller to be right on top of anything happening with the contact. However, even those most adept at remembering people and events may have a difficult time immediately recalling specific details when a call is received out of context. There is a limit on how much information can be "fresh" in a person's mind at any given time.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIGS. 2A-2B illustrate block diagrams of an embodiment of a mobile device displaying event information based on caller ID in response to receiving a call.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, a caller identification (ID) extension provides information in addition to standard caller ID information on a mobile device. Extended caller ID information provided during call notification of an incoming call includes scheduling information related to caller ID. A system enables accessing scheduling information based on the caller ID for the incoming phone call. A contact is identified based on the caller ID information, and scheduling information related to the contact is displayed on the mobile device before the call is answered.

The mobile device includes an agent or a program that executes in the background. When caller ID information for an incoming call is received, the agent accesses contact information while call notification occurs (e.g., while the phone rings or vibrates to indicate the incoming call). The agent also accesses scheduling information related to the contact while call notification occurs. The scheduling information for the contact can be selectively displayed. In one embodiment, there is more scheduling information than can be accessed in the time desired during call notification; thus, certain information may be selected (e.g., information of highest priority, information closest in time to the current date, or some other selection criterion) for display, while other information is not displayed. In one embodiment, there is more scheduling information than can be displayed in the space available on the mobile device; thus, certain information may be selected while other information is not displayed.

In one embodiment, scheduling information is stored and/or cached locally at the mobile device to allow access and display of the scheduling information during call notification. Locally cached information is synchronized with information stored in the backend (e.g., at a customer relationship management (CRM) system/server). The synchronization can occur, for example, at an off-peak hour, and/or during a time when the mobile device is wired with a computer. Selectively storing the information locally and synchronizing the information may allow the caller ID extension to be available with greater speed, and without consuming additional bandwidth during call notification. In one embodiment, an agent on the mobile device may determine a signal quality, and attempt to access data via a remote server if the signal quality is good, and only access local data if the signal quality is lower than a threshold.

Figure 1:
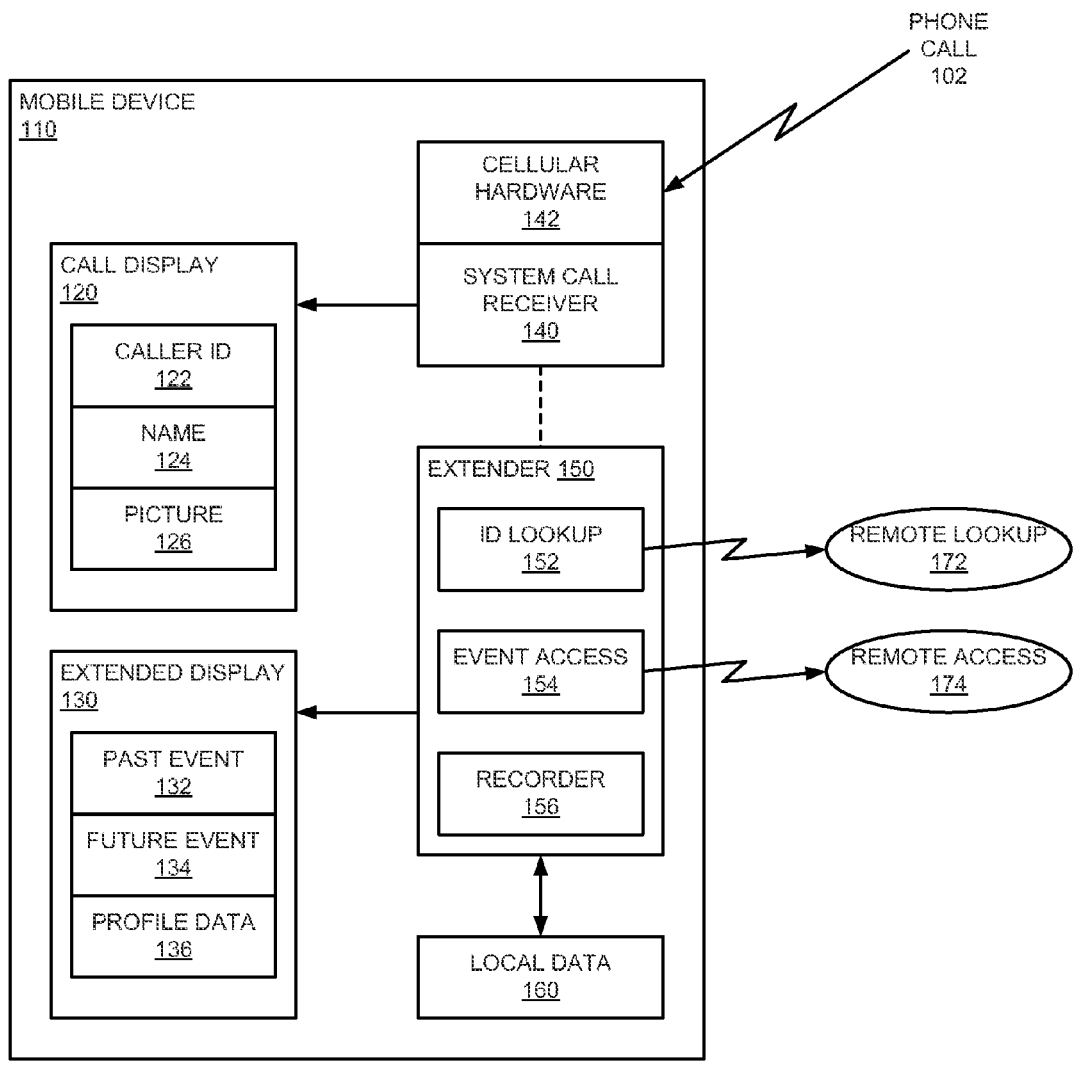
FIG. 1 is a block diagram of an embodiment of a system having a mobile device with caller ID extension.

FIG. 1 is a block diagram of an embodiment of a system having a mobile device with caller ID extension. Mobile device 110 includes features that enable caller ID extension according to any embodiment described herein. Mobile device 110 represents any type of a mobile communication device that can both receive a wireless phone call and access a wireless data connection. Such devices may include hones or other mobile phones, as well as other types of handheld mobile devices that have phone reception capability.

Standard call reception is provided with system call receiver 140 and call display 120. Incoming phone call 102 is wireless phone call received at a wireless transceiver of mobile device 110, understood to be part of cellular hardware 142. Cellular hardware 142 includes antennas, receive paths, filters, processors, and other components to enable mobile device 110 to connect to a cellular communication system. System call receiver 140 includes software and/or control logical to cause certain actions in response to phone call 102.

Traditionally, phone call 102 provides caller ID information shortly after call initiation. Typically, caller ID information 122 is displayed in call display 120 shortly after the first ring, or an equivalent sound or notification. ft mobile device 110 includes a local address book, it would traditionally also be able to display name 124 of a contact associated with the caller ID information, and potentially picture 126 (assuming one is available). All the access necessary and the generation of the display happen in close proximity to the first ring to indicate the incoming call in traditional systems.

Mobile device 110 includes extender 150, which enables it to provide extended display 130 in addition to call display 120. Extender 150 represents software and/or control logic that enables providing extended caller ID information in response to phone call 102. Extended display 130 may include any of past event 132, future event 134, or profile data 136. Data shown in extended display 130 is provided during call notification.

When extender 150 generates extended display 130, it will be understood that the extended display is a prediction of what the call may be about. There may be any type of rules or business logic in extender 150 to determine what information to display in extended display 130. Examples of rules may be proximity in time of scheduled events or activities to a current date and time, whether the event occurs in the past or future, what priority may be associated with an event, a threshold of a number of events, or other rules.

Past event 132 represents one or more of any type of events or scheduled activities that occur in the past or are current (e.g., a call about a scheduled event for the current time). For example, if a user of mobile device 110 misses an appointment, or is late for an appointment, the other party may attempt to contact the user to find out what is going on. In such an example, extender 150 may display the missed (or current) appointment in response to phone call 102. There may be limits on how far into the past extender 150 will search for events. For example, there may be little practical point in going beyond a day or two, or maybe even just a few hours in certain circumstances, depending on system configuration.

Future event 134 represents one or more of any type of events or scheduled activities that occur in the future. In one embodiment, there are limits placed on how many events are obtained, or how far into the future the system looks for events. Future events may include meetings, appointments, phone calls, presentations, deadlines, scheduled milestones, or other activities.

Profile data 136 represents any type of data related to the contact other than scheduling data. For example, there may be something that the user of mobile device 110 should talk to a contact about the next time the user talks to the contact. Such information can be stored in a CRM system and brought up by extender 150 during call indication. Examples may include questions regarding an invoice, following-up regarding a meeting or event the contact had scheduled (and was not necessarily scheduled for the user of mobile device 110). Such information can be stored as separate events, or could simply be stored as annotations, which can then be accessed for the contact.

It will be understood that the distinction between "current" activities and "past" or "future" activities may be very small. To the extent "current" activities are identified in response to an incoming phone call, they are treated essentially the same as past or future events. Many mobile devices with calendaring or scheduling systems available are able to provide a notification of an event. It will be understood that there is a distinction with that capability and what is described herein. As described herein, even assuming an event notification was generated by the mobile device in response to the occurrence of the event, extender 150 may still display the event in response to phone call 102 as a prediction that the event is the reason for the call. Such a prediction can enable the user of mobile device 110 to perform a mental refresh as to the subject matter of the event prior to answering the call.

For any type of data displayed in extended display 130, the general principle is that phone call 102 provides caller ID information, which is used by extender 150 to access events, which are then displayed on extended display 130 during call notification. ID lookup 152 represents one or more components of extender 150 that allow it to identify a contact based on caller ID information. Contact information may be stored as a list or a database on mobile device 150, such as in local data 160. In one embodiment, caller ID is used as a key to look up a particular contact. The contact may then be a key used to access events with event access 154. Event access 154 represents one or more components that enable extender 150 to identify event data including scheduling data for the identified contact.

In one embodiment, ID lookup 152 and event access 154 access local data 160 to identify contacts and events. In one embodiment, ID lookup 152 passes caller ID information to a remote server via remote lookup 172. The remote server could identify a contact based on caller ID information. Similarly, in one embodiment, event access 154 passes contact information to a remote server via remote access 174 to access scheduling information from the remote server. In the case that caller ID information is sent for remote lookup, extender 150 may simply receive contact and scheduling data in response to the sending of caller ID information. It will be understood that remote lookup 172 and remote access 174 represent separate connections from phone call 102. The data access connections may be made in response to phone call 102.

In one embodiment, extender 150 includes recorder 156. Recorder 156 represents components that enable extender 150 to keep a log of call information, and even provide access to specific events or activities for annotation. For example, in response to a request by the user, recorder 156 can annotate scheduling data with information related to the phone call, such as date and time. Thus, the event itself can then have a record that the call was made. Additionally, in one embodiment, a user can access the extender either during or after the phone call to annotate appointments or access appointments to make changes.

In one embodiment, the user of mobile device 110 can customize the system, and can select what data is desired to be received. For example, a particular user may only care about appointments, and not tasks that need to be completed (such as represented by deadlines or presentations). The user can select thresholds for how many activities to access, how far forward in time to look for activities, how to determine priority, or other customizations.

The description with reference to the system of FIG. 1 illustrates various details with reference to the specific system. A more general description without reference to any particular drawing element follows.

An extended display is provided for information based on caller ID during call notification for an incoming phone call on a mobile device. A system enables accessing scheduling information based on caller ID information for the incoming phone call. A contact is identified based on the caller ID information, and scheduling information related to the contact is displayed on the mobile device before the call is answered.

In response to receiving a phone call at a mobile device, and while call notification occurs, a mobile device accesses scheduling information relevant to the caller. The caller is identified as a contact of the user of the mobile device based on caller ID information. Scheduling information related to the identified contact is accessed based on the identified contact, based on the caller ID information. In one embodiment, a system could be set up to use the caller ID information to directly access the scheduling information, rather than using it indirectly by first directly identifying a contact. In one embodiment, the mobile device initiates a call or data connection to a remote CRM system to retrieve relevant scheduling information, such as upcoming activities scheduled for the contact. In one embodiment, the mobile device uses a locally cached copy of CRM data rather than initiating a real-time connection.

By displaying the extended caller ID data during the call notification, the mobile device user can review the data and refresh information related to the caller. Thus, the caller may expect that the mobile device user has not answered because the mobile device user is not yet able to answer the call. However, the user of the mobile device can actually be reviewing data to cc-orient the mobile device user to the caller. Once the phone call is answered, the mobile device user may have been able to switch contexts from what the user was doing. Additionally, in certain circumstances, the mobile device user may not have much time to talk. Thus, the mobile device user can still answer the call, but do so more expeditiously because of having a context to address the incoming call.

As referred to herein, the caller ID extension identifies a contact based on caller ID information responsive to an incoming phone call. In one embodiment, identifying the contact occurs in conjunction with accessing the scheduling data. For example, where caller ID information is accessed directly based on caller ID information, the contact is still identified for display, but not as a separate operation from accessing the scheduling data. There is not necessarily a requirement that the contact be identified before the scheduling data is accessed for the specific contact associated with the caller ID information.

It will be understood that by selecting among multiple possible scheduled events or activities, the caller ID extension system is generating a prediction of what an incoming phone call will be about. There is no guarantee the displayed information will actually be the subject the call, but by displaying the information, the mobile phone uses mind is drawn to the particular contact initiating the call. Recalling a little bit of information prior to taking the call can enable the user of the mobile device to more readily call to mind other information about the contact.

In one embodiment, identifying the contact can be accomplished from a contact list on the mobile device. The contact list may be the default contact list for the mobile device, or could be a contact list specifically set up for purposes of providing extended caller ID information. In one embodiment, the contact list includes information stored in a CRM system on a remote server; thus, the information in the contact list may need to be synchronized. The frequency of synchronization would depend on the frequency with which changes are made to the contacts in the CRM system. In one embodiment, the mobile device may periodically (e.g., daily) query the CRM system if changes have been made, and if so, synchronization can occur.

Similar to the contact information, scheduling data may be accessed from a remote server (e.g., via a real-time connection made to the remote server in response to the incoming phone call) or via accessing a locally cached copy of scheduling data. The locally cached copy of scheduling data would improve access time. The locally cached copy would need to be periodically synchronized (e.g., daily, hourly) with a back-end system from which the data is obtained to for local caching. Thus, access to a remote server for scheduling data may still occur, but not in response to receiving a phone call. Rather, the mobile phone can proactively seek data (e.g., during an off-peak time such as the middle of the night) to synchronize and obtain scheduling data that someone may call about.

FIGS. 2A-2B illustrate block diagrams of an embodiment of a mobile device displaying event information based on caller ID in response to receiving a call. As illustrated in FIG. 2A, mobile device 210 generates call notification display 220 in response to an incoming phone call. Call notification 220 may include picture 222 of a contact associated with the call (based on caller ID information), name 224 of the contact, and caller ID 226, which displays the phone number of the incoming call. Each of these is available on current mobile devices. However, mobile device 210 further includes extender 230, which provides extended caller ID information. In one embodiment, extender 230 may be inactivated, and thus, nothing but the standard caller ID information might be displayed.

FIG. 2B illustrates extended caller ID information provided by extender 230. In addition to picture 222, contact name 224, and caller ID 226, extender 230 may provide an extended display. The illustration has multiple events, separated by priority. In one embodiment, priority is used to indicate events related to the contact associated with the caller ID of the incoming phone call. In other embodiments, priority is not used.

High priority activities 240 include activity 242, which describes a meeting about providing product specifications, and activity 244, which describes a meeting to show a presentation for a particular project. It will be observed that activity 242 is dated for Nov. 5, 2010, while activity 244 is dated for Mar. 10, 2011. Depending on when the call is received, and what settings are applied to mobile device 210, one or both of the events may not even display. For example, extender 230 may not keep cached, or may not obtain remotely, events that are outside a particular date range of the phone call.

If the phone call is received on Nov. 3, 2010, the November 5 meeting would probably be desirable to show, but perhaps the Mar. 10, 2011 date is too far in the future for extender 230 to obtain or display (based on configuration settings, or storage space limitations). If the phone call is received on Nov. 7, 2010, the date in the past may have not trigger the display, and the meeting in March 2011 may be too far in the future. In one embodiment, at least one (e.g., the next scheduled event) event or activity is stored for each contact, assuming there is at least one. Such a configuration could be an exception to a general rule to not store events farther in the future than a threshold.

Low priority activities 250 include activity 252, which describes a status update call scheduled for Oct. 28, 2010, Again, the fact that the activities are shown suggests that according to the configuration of mobile device 210, all these activities are within the parameters of what data to show in response to the phone call. Other configurations may eliminate certain items from being shown. In accordance with FIG. 2B, it will be understood that the configuration of extender 230 is very flexible, and can be set up for any of a variety of different scenaros.

Figure 3:
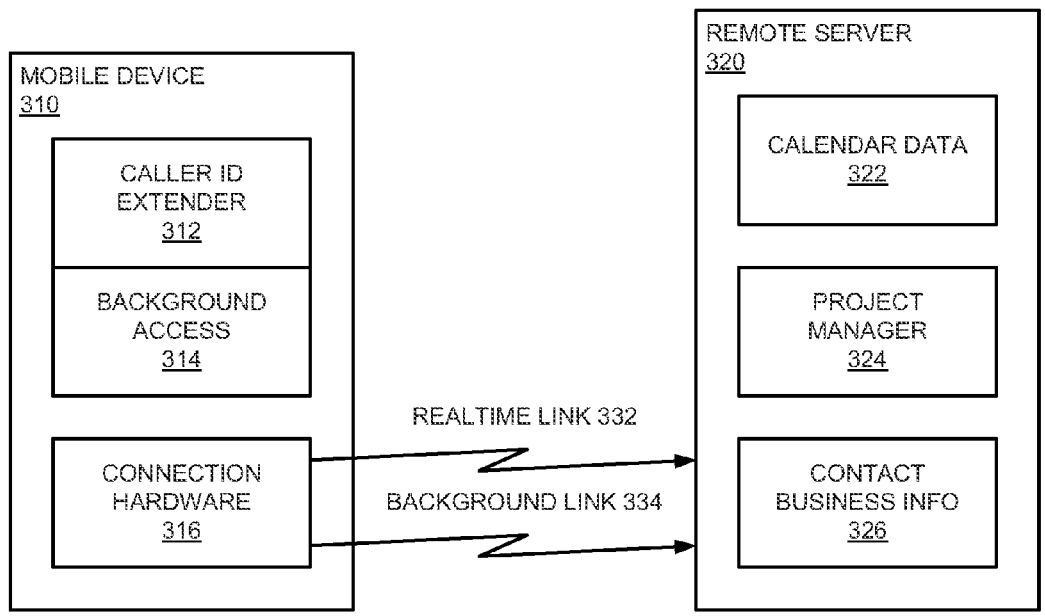
FIG. 3 is a block diagram of an embodiment of a system with a mobile device that accesses a remote server for caller ID extension information.

FIG. 3 is a block diagram of an embodiment of a system with a mobile device that accesses a remote server for caller ID extension information. System 300 includes mobile device 310 and remote server 320. Mobile device 310 represents a mobile communications device that includes caller ID extender 312. Mobile device 310 provides extended caller ID information according to any embodiment described herein. Remote server 320 represents a system separate from mobile device 310, which mobile device 310 accesses to obtain scheduling information that can be provided in an extended caller ID display.

In one embodiment, caller ID extender 312 is incorporated directly into the incoming call handling system of mobile device 310. In one embodiment, multitasking is available at least to some extent to enable an agent or application associated with caller ID extender 312 to execute concurrently with the incoming call handling system of mobile device 310. In one embodiment, caller ID extender 312 includes an agent that is to execute in the background of a platform mobile operating system (OS)) to allow it to operate when a call is received. Caller ID extender 312 accesses data at the same time a phone call is received; thus, mobile device 310 should support the ability to access data at the same time as receiving a phone call to implement the functions of caller ID extender 312.

In one embodiment, caller ID extender 312 is configured to access remote server 320 concurrently while receiving an incoming phone call. To access remote server while a phone call is incoming, mobile device 310 should support the ability to make a data connection concurrently with receiving a phone call. The data connection is likely to be made on a network connection separate from a connection supporting the phone call. Connection hardware 316 includes hardware including antennas, processors, and other components to enable mobile device 310 to initiate a wireless data connection and receive data over the connection. Caller extender 312 and background access 314 are understood to connect to remote server 320 via connection hardware 316.

Real-time link 332 represents a data connection that can be accessed at the same time as receiving an incoming phone call. The connection is considered "real-time" in that certain performance requirements must be available to allow data to be received in a way that it can be shown on mobile device 310 during call notification (e.g., ringing). Thus, it is real-time because it occurs while the other function of call notification is occurring, Background access 314 can operate in addition to a real-time connection, or in place of a real-time connection. The fact that a real-time connection can be made does not preclude mobile device 310 from being configured to access and synchronize scheduling data in a background process. Background access 314 initiates a connection (background link 334) to remote server 320 at some point in time not in response to an incoming phone call. Rather, background access 314 accesses data in anticipation that a phone call may be made. That way, mobile device 310 is ready in case a phone call is received.

Whether via real-time link 332 or background link 334, mobile device 310 accesses remote server 320 for scheduling data. The access can occur via standard HTTP (hypertext transfer protocol) calls or the use of other standard protocols to query remote server 320 from mobile device 310. On mobile device 310, a simple text file or database can be cached to store the data access (especially if access via background access 314 for later use). In one embodiment, data is only access for selected contacts. In one embodiment, data is accessed for all contacts.

Remote server 320 includes any one or more different types of data. In one embodiment, any one or more of the data types are available in a CRM system hosted by remote server 320. Calendar data 322 represents data available from a calendaring system. Calendaring systems are known, and associate activities or events with specific days and/or times. Calendar data may include scheduling information related to upcoming events or appointments, scheduled meetings, phone calls, teleconferences, or other calendar items.

Project manager 324 represents data available from a project management system. A project management system provides timelines and events for specific work projects and work tasks. Thus, via project manager 324, scheduling information to be displayed in extended caller ID information could include a scheduled event related to a task associated with work to be performed for the contact associated with caller ID information. The task can be any work or project for the contact having scheduled goals or project deadlines.

In one embodiment, mobile device 310 may access business profile information for the contact, as represented by contact business information 326. The profile information may include small amounts of information related to payments or news related to the contact. While it is possible to include such information in extended caller ID displays, it will be understood that the information may be of limited value unless it is short to allow a mobile device user to see it and absorb it very quickly, it will be understood that many backend systems (such as CRM systems or calendar systems) require authentication or other security permissions for data access. Permissions can still be enforced with the access described herein. Thus, a user cannot access data for which no permissions are available. In one embodiment, remote server 320 can identify the user based on an identifier passed to the system for access by the mobile device. The mobile device identifier in turn is associated with the user of the mobile in the remote server, which can enable the remote server to enforce permissions associated with the specific user associated with the mobile device.

Figure 4:
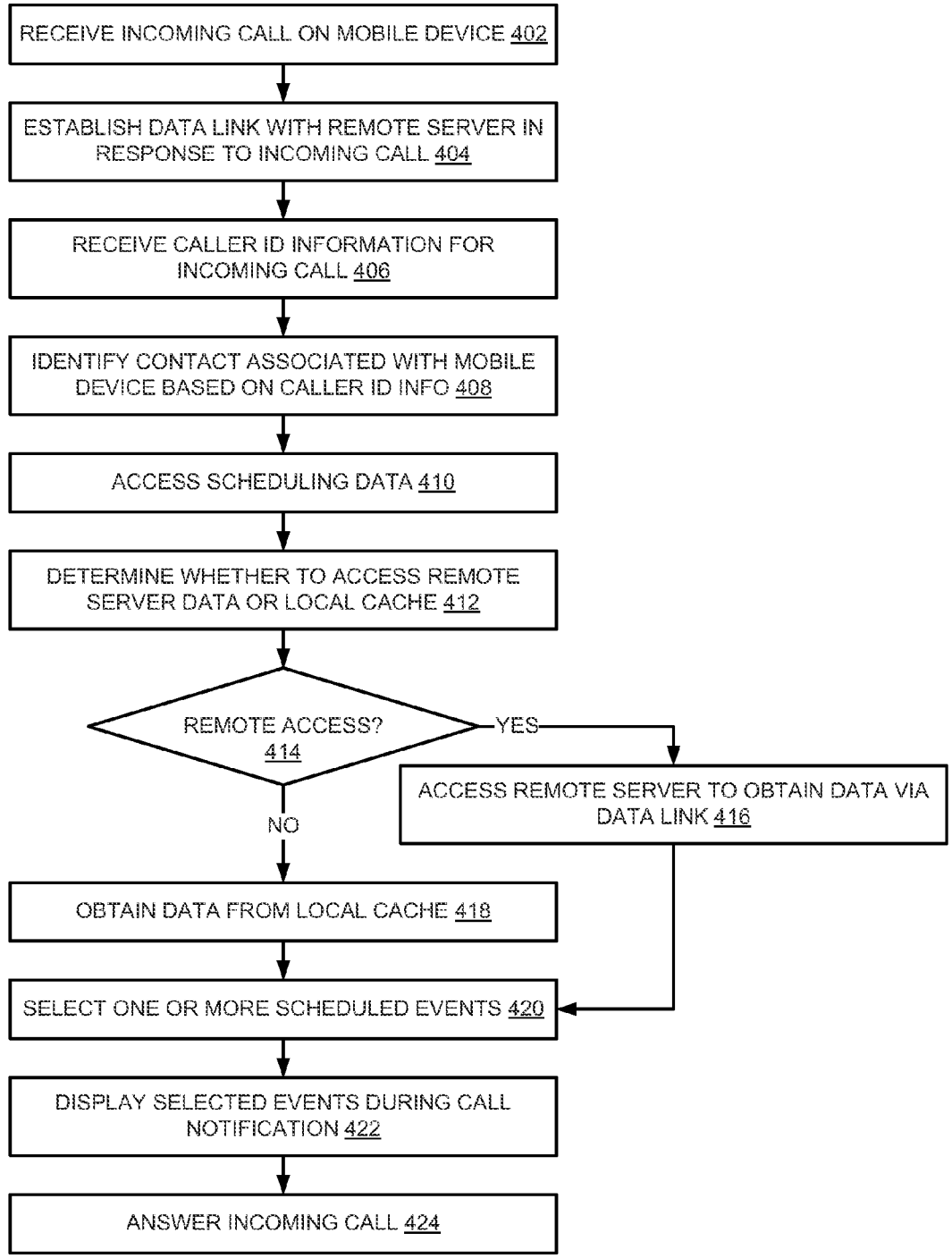
FIG. 4 represents a flow diagram of an embodiment of extending incoming call notification with event information based on caller ID information.

FIG. 4 represents a flow of an embodiment of extending incoming call notification with event information based on caller ID information. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments of the invention; thus, not all actions are required in every implementation. Other process flows are possible.

A mobile device receives an incoming call, 402. The mobile device is able to perform various operations as set forth below in response to an incoming call, which operations wilt be controlled by an agent or application on the mobile device that provides extended caller ID. In one embodiment where the mobile device uses a real-time link to access data from a remote server, the mobile device establishes a data link with the remote server in response to the incoming call, 404. The link can be established even before caller ID information is received, if it is triggered by the receipt of the phone call rather than receipt of the caller ID information. When a wireless call comes into the mobile device, caller ID information is sent, and will be received at the mobile device, 406.

The mobile device identifies a contact associated with the mobile device based on the caller ID information, 408. The identification of a contact can be via local contact information. In one embodiment, the identification of the contact is performed remotely. The mobile device accesses scheduling data related to the contact, 410. Thus, based on the caller ID, the mobile device is to access data related to a contact associated with the caller ID information.

In one embodiment, the mobile device always accesses locally cached information, which is synchronized, for example, at scheduled times. In one embodiment, the mobile device may always first attempt to access scheduling data remotely before defaulting to local information if remote access is unsuccessful. In one embodiment, the mobile device determines whether to access remote server data or a local cache, 412. For example, the mobile device may attempt to access the remote server and not be able to connect. As another example, the mobile device may determine that signal quality is too poor to attempt to connect to the remote server. In one embodiment, the mobile device may attempt to access the remote server if connected to a WiFi (or WiMAX or similar link)link (e,g, 802.1x access point), but not attempt to connect if only a cellular data service is available and not WiFi.

If the mobile device determines to use remote access, 414, the mobile device accesses the remote server to obtain data via a data link, 416. If the mobile device determines not to use remote access, 414, the mobile device obtains data only from locally stored data, 418. Whether via remotely accessed or locally accessed data, the mobile device selects one or more scheduled events from the scheduling data, 420.

The mobile device displays the selected event or events during call notification, 422. The user of the mobile device can then review the displayed events prior to answering the phone call. The user then answers the incoming call, 424. In one embodiment, the answering of the phone call ends the extended caller ID display. In another embodiment, the extended caller ID display, and in particular the display of upcoming events, may continue after the phone call has been answered. Allowing the display of scheduling information after the call has been answered can still provide a useful feature for a user. For example, many users will answer the phone with a hands-free system, meaning the user does not put the mobile device to the user's ear and face to answer the call. Thus, the user could answer the phone call and still review the displayed event information for a short period of time while starting the phone call.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communications interface to send data via the communications interface. A machine readable medium or computer readable medium may cause a machine to perform the functions or operations described, and includes any mechanism that provides (i.e., stores and/or transmits) information in a form accessible by a machine (e.g., computing device, electronic system, or other &vice), such as via recordable/non-recordable media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   receiving caller ID information for an incoming phone call on a wireless mobile communication device;
   identifying a contact for a user of the mobile communication device based on the caller ID information;
   accessing scheduling data specific to the identified contact to identify scheduled events related to the contact;
   selecting one or more of the identified scheduled events as a prediction of a subject of the incoming phone call; and
   displaying the selected scheduled events during call notification responsive to the incoming phone call, and before the incoming phone call is answered.

2. The method of claim 1, wherein identifying the contact comprises:
   identifying the contact from a group of contacts stored locally on the mobile communication device.

3. The method of claim 1, wherein identifying the contact and accessing the scheduling data further comprises:
   accessing contact information with the caller ID information as a key; and
   accessing scheduling data with the contact information as a key.

4. The method of claim 1, wherein identifying the contact comprises:
   sending the caller ID information to a remote server over a network connection separate from the incoming phone call; and
   receiving information identifying the contact from the remote server.

5. The method of claim 1, wherein accessing the scheduling data comprises:
   accessing a locally cached copy of scheduling data.

6. The method of claim 5, wherein accessing the locally cached copy of the scheduling data further comprises:
   accessing a remote server for scheduling data over a network connection separate from the incoming phone call, the accessing to cache scheduling data on the mobile communication device, and not in response to receiving the phone call.

7. The method of claim 1, wherein accessing the scheduling data comprises:
   accessing a remote server over a network connection separate from the incoming phone call.

8. The method of claim 7, wherein the remote server includes CRM (customer relationship management) data, and further comprising:
   accessing CRM data related to a business profile of the identified contact in addition to the scheduling data.

9. The method of claim 1, wherein accessing the scheduling data comprises:
   accessing a calendaring system.

10. The method of claim 1, wherein selecting the one or more scheduled events comprises:
   selecting at least one upcoming event that occurs in the future.

11. The method of claim 1, wherein selecting the one or more scheduled events comprises:
   selecting a scheduled meeting with the contact.

12. The method of claim 1, wherein selecting the one or more scheduled events comprises:
   selecting a scheduled event related to a task associated with work to be performed for the contact.

13. An article of manufacture comprising a computer readable storage medium having content stored thereon, which when executed, cause a machine to perform operations including:
   receiving caller ID information for an incoming phone call on a wireless mobile communication device;
   identifying a contact for a user of the mobile communication device based on the caller ID information;
   accessing scheduling data specific to the identified contact to identify scheduled events related to the contact;
   selecting one or more of the identified scheduled events as a prediction of a subject of the incoming phone call; and
   displaying the selected scheduled events during call notification responsive to the incoming phone call, and before the incoming phone call is answered.

14. The article of manufacture of claim 13, wherein the content to provide instructions for identifying the contact and accessing the scheduling data further comprises content to provide instructions for
   accessing contact information with the caller ID information as a key; and
   accessing scheduling data with the contact information as a key.

15. The article of manufacture of claim 13, wherein the content to provide instructions for accessing the scheduling data comprises content to provide instructions for
   accessing a locally cached copy of scheduling data.

16. The article of manufacture of claim 15, wherein the content to provide instructions for accessing the locally cached copy of scheduling data further comprises content to provide instructions for
   accessing the scheduling data not in response to the incoming phone call.

17. The article of manufacture of claim 13, wherein the content to provide instructions for accessing the scheduling data comprises content to provide instructions for
   accessing a customer relationship management (CRM) system.

18. A mobile communications device comprising:
   cellular transceiver hardware with which to receive an incoming wireless phone call, including caller identification (ID) information;
   data connection hardware to establish a wireless data connection with a remote server to access scheduling data from the remote server;
   a storage device to store scheduling data accessed from the remote server; and
   a caller ID extension agent to identify a contact for a user of the mobile communication device based on the caller ID information, access scheduling data specific to the identified contact from the storage device to identify scheduled events related to the contact, select one or more of the identified scheduled events as a prediction of a subject of the incoming phone call, and display the selected scheduled events during call notification responsive to the incoming phone call, and before the incoming phone call is answered.

19. The mobile communications device of claim 18, wherein the caller ID extension agent is to further:
   access contact information with the caller ID information as a key; and
   access scheduling data with the contact information as a key.

20. The mobile communications device of claim 18, wherein the scheduling data comprises data from a customer relationship management (CRM) system.

* * * * *